United States Patent
Luniya

(10) Patent No.: US 10,944,782 B2
(45) Date of Patent: Mar. 9, 2021

(54) FORENSIC ANALYSIS THROUGH METADATA EXTRACTION

(71) Applicant: EMC IP Holding Company LLC, Hopkinton, MA (US)

(72) Inventor: Amit Anandram Luniya, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 212 days.

(21) Appl. No.: 16/209,561

(22) Filed: Dec. 4, 2018

(65) Prior Publication Data
US 2020/0177622 A1     Jun. 4, 2020

(51) Int. Cl.
| | | |
|---|---|---|
| H04L 29/06 | (2006.01) | |
| G06F 11/30 | (2006.01) | |
| G06F 16/17 | (2019.01) | |
| G06F 16/182 | (2019.01) | |

(52) U.S. Cl.
CPC ...... *H04L 63/1441* (2013.01); *G06F 11/3086* (2013.01); *G06F 16/1734* (2019.01); *G06F 16/182* (2019.01); *H04L 63/1416* (2013.01); *H04L 63/1425* (2013.01)

(58) Field of Classification Search
CPC ...... G06F 21/60; G06F 21/602; G06F 21/604; G06F 21/62; G06F 21/78; G06F 21/80; G06F 21/86; G06F 21/88; G06F 16/182; G06F 16/1734; G06F 11/3086; H04L 63/1441; H04L 63/1416; H04L 63/1425
See application file for complete search history.

(56) References Cited

U.S. PATENT DOCUMENTS

| | | | | |
|---|---|---|---|---|
| 9,330,107 | B1* | 5/2016 | Kesselman | G06F 16/182 |
| 2005/0223164 | A1* | 10/2005 | Kitamura | G06F 21/10 |
| | | | | 711/112 |
| 2014/0006465 | A1* | 1/2014 | Davis | G06F 16/183 |
| | | | | 707/827 |
| 2014/0164452 | A1* | 6/2014 | Ying | G06F 16/182 |
| | | | | 707/827 |
| 2015/0222656 | A1* | 8/2015 | Haugsnes | H04L 63/1441 |
| | | | | 726/23 |

(Continued)

*Primary Examiner* — Malcolm Cribbs
(74) *Attorney, Agent, or Firm* — Amin, Turocy & Watson, LLP

(57) ABSTRACT

In one or more embodiments described herein, system, methods, and/or computer program products that forensic analysis through metadata extraction. According to an embodiment, a system can comprise a memory that stores computer executable components and a processor that executes the computer executable components stored in the memory. The computer executable components can comprise a metadata generation component that generates a metadata product comprising one or more data items associated with a distributed architecture of a file system, wherein the file system comprises one or more disks. The computer executable components can further comprise a security component that monitors the file system, wherein the security component generates an alert in response to detecting a degradation event associated with the one or more disks. The computer executable components can further comprise a metadata extractor component that extracts the one or more data items from the metadata product in response to receiving the alert from the security component.

20 Claims, 10 Drawing Sheets

(56) References Cited

U.S. PATENT DOCUMENTS

| | | | |
|---|---|---|---|
| 2016/0026810 A1* | 1/2016 | Hagiwara | G06F 3/06 |
| | | | 713/193 |
| 2017/0054745 A1* | 2/2017 | Zhang | H04L 67/06 |
| 2017/0193006 A1* | 7/2017 | Cha | G06F 16/182 |
| 2018/0034837 A1* | 2/2018 | Lakhani | H04L 63/1425 |
| 2018/0316708 A1* | 11/2018 | Strong | G06N 20/00 |
| 2019/0340374 A1* | 11/2019 | Gupta | G06F 16/907 |
| 2020/0057953 A1* | 2/2020 | Livny | G06K 9/6218 |

* cited by examiner

FORENSIC ANALYSIS THROUGH METADATA EXTRACTION

TECHNICAL FIELD

The subject disclosure relates generally to forensic analysis after a cyber-attack, and more particularly, systems, computer-implemented methods, and computer program products that facilitate forensic analysis through metadata extraction.

BACKGROUND

Confidential and sensitive data is generally stored at data centers around the world. The confidential and sensitive data is stored on one or more nodes each comprising one or more hard drives (e.g., disks). The data centers employ highly sophisticated technology to allow fast access to data and employ sophisticated anti-cybercrime technology that protect the stored data against cybercrime. The anti-cybercrime technology provides security against data theft by use of computers and internet. The data centers also provide security against physical threat such as physical theft of hardware (e.g., computer disk or server). Although technology is available to prevent data theft by computers and allows administrators of data centers to identify the source theft and content of stolen data if the data theft occurs. However, it is difficult to quickly identify content of stolen data and potential impact of physical theft of hardware that contain the confidential data. With physical theft, the confidential data may not be exposed until further hacking attempts, but the data stored on the stolen hard drive is at high risk of being compromised. Also, the administrators of data center may not be able to identify content of data (e.g., credit cards, emails, sensitive data, etc.) was or will be exposed. In addition, identifying the owner of stolen data would be difficult with physical theft since the data is may be stored without unstructured on or more hard drives. These issues can be disastrous for a data center without a forensic analysis technique that can quickly identify what type of data is at risk and notify owners of the data that is at risk.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate forensic analysis through metadata extraction.

According to an embodiment, a system can comprise a memory that stores computer executable components and a processor that executes the computer executable components stored in the memory. The computer executable components can comprise a metadata generation component that generates a metadata product comprising one or more data items associated with a distributed architecture of a file system, wherein the file system comprises one or more disks. The computer executable components can further comprise a security component that monitors the file system, wherein the security component generates an alert in response to detecting a degradation event associated with the one or more disks. The computer executable components can further comprise a metadata extractor component that extracts the one or more data items from the metadata product in response to receiving the alert from the security component.

According to another embodiment, a method can comprise generating, by a network storage device comprising a processor, a metadata product having one or more data items associated with an architecture of a distributed file system. The method can further comprise extracting, by the network storage device, the one or more data items from the metadata product in response to receiving an alert, wherein the alert is generated in response to an occurrence of a degradation event. The method can further comprise generating, by the network storage device, a report comprising the one or more data items extracted by the network storage device.

According to another embodiment, a computer program product that provides information about a disk associated a degradation event, the computer program product comprising a computer readable storage medium having program instructions embodied therewith, the program instructions executable by a processor to cause the processor to generate, by a metadata generation component, a metadata product having one or more data items associated with an architecture of a distributed file system, wherein the one or more data items comprise identification and location information of a node of the distributed file system, identification of a disk of the distributed file system, and one or more characteristics of content stored within the disk; monitor, by a security component, the distributed file system, wherein the security component generates an alert in response to detecting the degradation event associated with the disk; extract, by a metadata extractor component, the one or more data items from the metadata product in response to receiving the alert from the security component.

DETAILED DESCRIPTION

The following detailed description is merely illustrative and is not intended to limit embodiments and/or applications or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Figure 1:
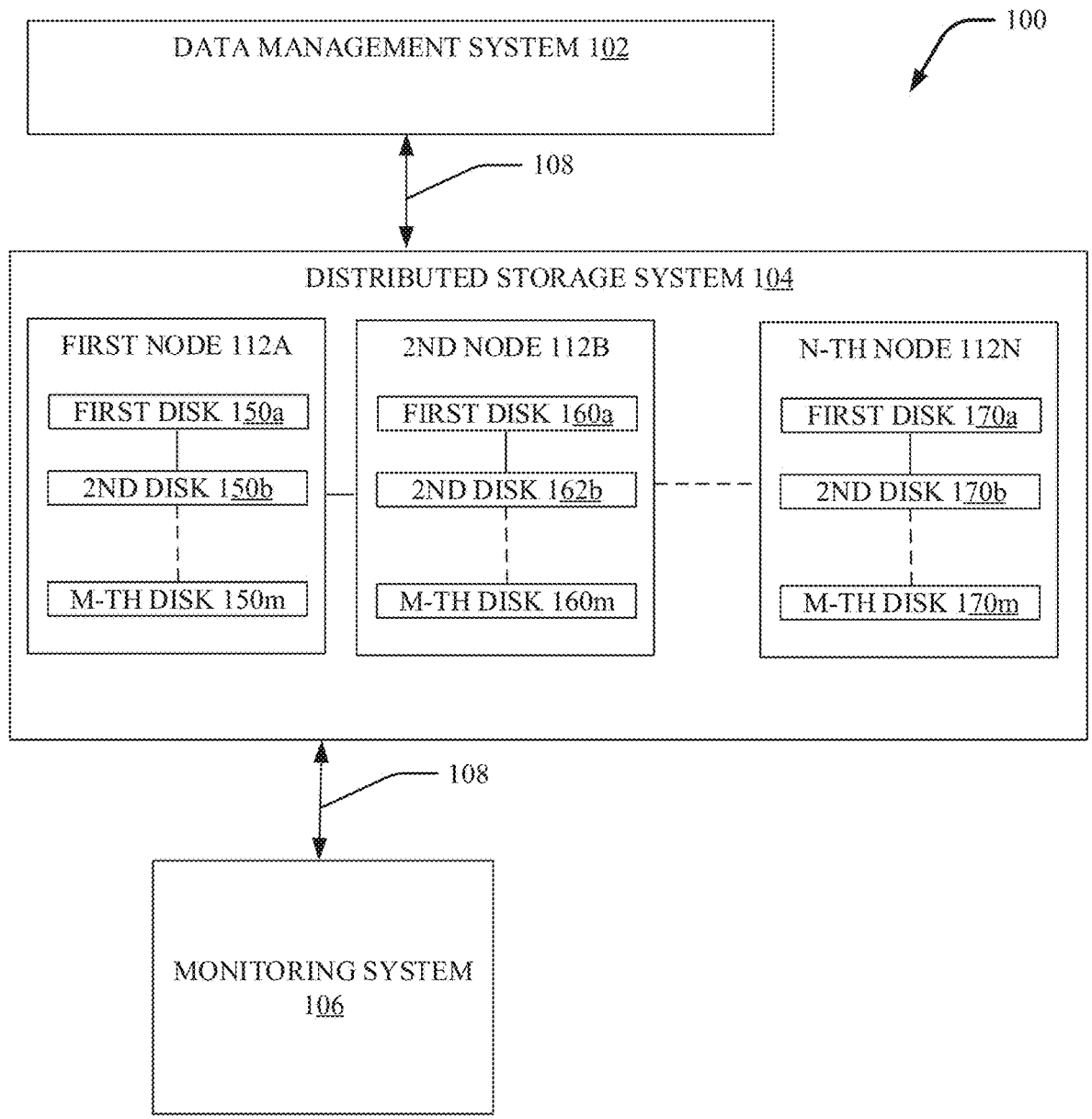
FIG. 1 illustrates an example of a data storage system employed by a data center to store and protect data in accordance with one or more embodiments described herein.

FIG. 1 illustrates an example of a data storage system 100 employed by a data center to store and protect data in accordance with one or more embodiments described herein. Repetitive description of like elements employed in respective embodiments is omitted for sake of brevity. According to some embodiments, the data storage system 100 can comprise a data management system 102, a distributed storage system 104 and a monitoring system 106 which are communicatively coupled to each other via a network 108. In some embodiments, the monitoring system 106 can be incorporated in a network storage device (not shown) that facilitate execution of various components (described below) of the monitoring system 106. In some embodiments, the network 108 can include any suitable type of communication network or combination thereof, including networks using protocols such as Ethernet, Internet Small Computer System Interface (iSCSI), Fibre Channel (FC), and/or wireless protocols. The data management system 102 issue commands to read and write data using the network 108. Write requests can include requests to store new data and requests to update previously stored data. Data read and write requests can include an ID value to uniquely identify the data within the distributed storage system 104. In some embodiments, the distributed storage system 104 can include one or more storage nodes 112a, . . . , 112n (generally denoted as storage node 112'). Each storage node 112' can comprise one or more disks (also referred to as hard drive) 150a, . . . , 150m (generally denoted as disk 150'), one or more disks 160a, . . . , 160m (generally denoted as disk 160'), and one or more disks 170a, . . . , 170m (generally denoted as disk 170'), respectively. In general operation, the data (e.g., bank account data, credit card data, emails, and various sensitive information) store using one or more of the storage nodes 112' and one or more disks 150', 160' and/or 170'. In some embodiments, a monitoring system 106 can monitor various transactions and can be used for forensic analysis. Details of the monitoring system 106 are described in detail below.

Figure 2:
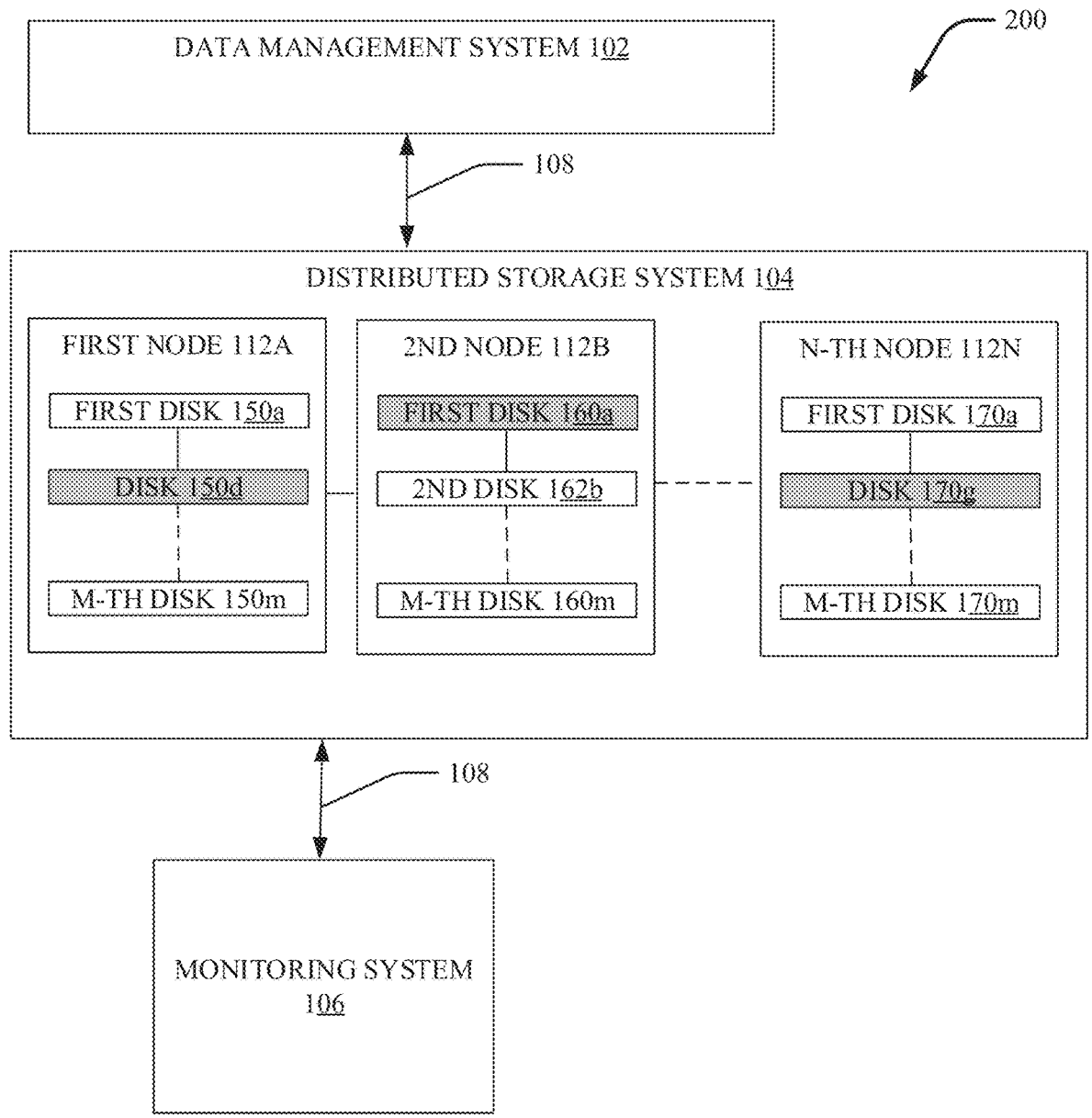
FIG. 2 illustrates an example of non-limiting data storage system having one or more stolen or breached disks in accordance with one or more embodiments described herein.

FIG. 2 illustrates an example of non-limiting data storage system 200 having one or more stolen or breached disks in accordance with one or more embodiments described herein. Repetitive description of like elements employed in respective embodiments is omitted for sake of brevity. As illustrated, disk 150d of storage node 112a may be stolen or breached (as illustrated by the shaded disk), disk 160d of storage node 112b may be stolen or breached (as illustrated by the shaded disk) and disk 170g of storage node 112n may be stolen or breached (as illustrated by the shaded disk). As discussed further in detail, a theft or breach of any median (e.g., disks or hard drives) will trigger a degradation event. As discussed in more details below, an unauthorized removal or access to one of the disk 150' can trigger a degradation event. In such an event, information about the disk 150' and what type of content that may be at risk are transmitted to administrator of the distributed storage system 104.

Figure 3:
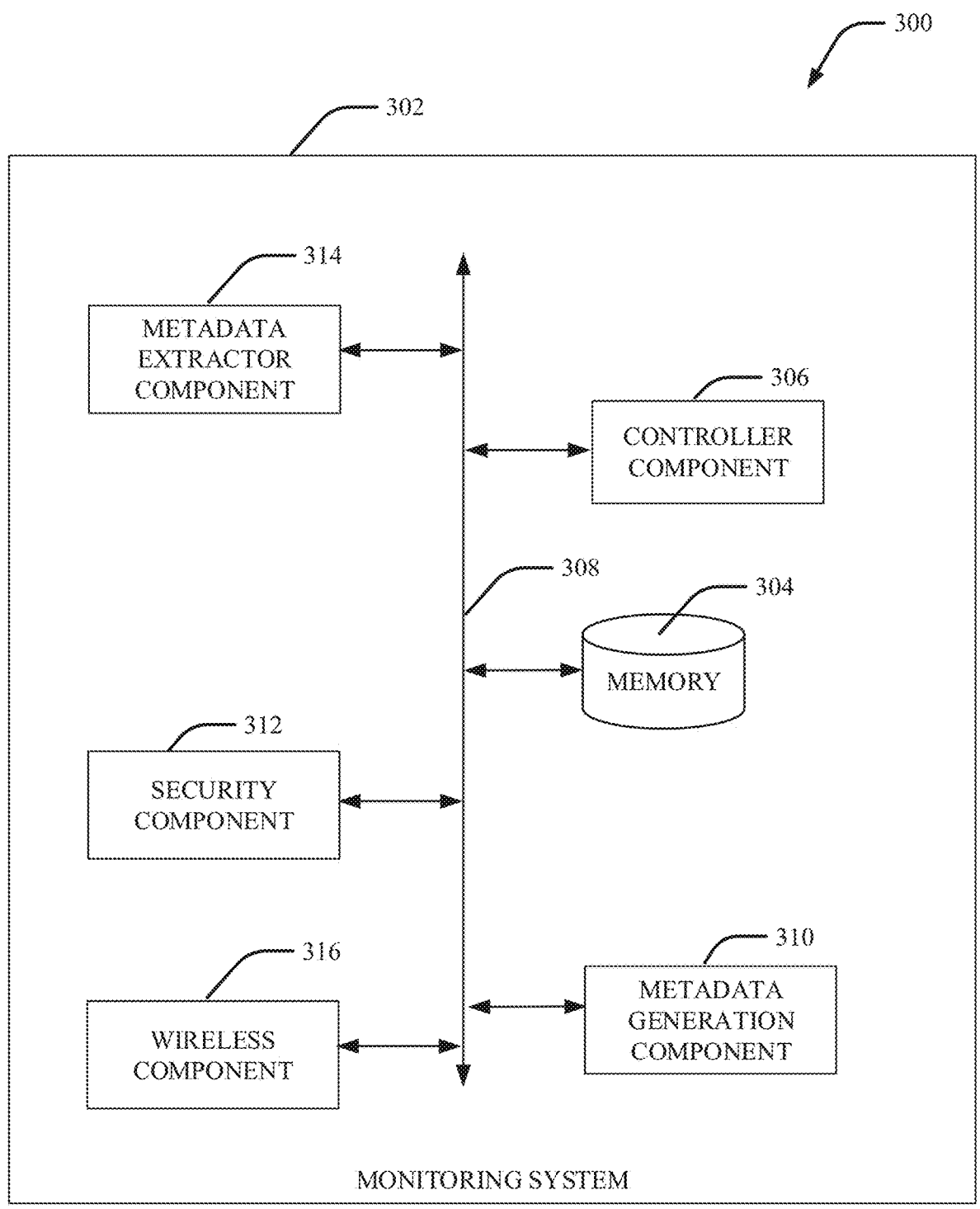
FIG. 3 illustrates a block diagram of an example, non-limiting system that facilitates operation of performing forensic analysis by extracting metadata in accordance with one or more embodiments described herein.

FIG. 3 illustrates a block diagram of an example, non-limiting system 300 that facilitates operation of performing forensic analysis by extracting metadata in accordance with one or more embodiments described herein. Repetitive description of like elements employed in respective embodiments is omitted for sake of brevity. According to some embodiments, the system 300 can comprise a mobile device (not shown) and/or a fix facility with one or more computers that can monitor activities of the distributed storage system 104. In some embodiments, the monitoring system 302 can also include or otherwise be associated with a memory 304, a controller component 306 (also referred to as a "processor") that executes computer executable components stored in a memory 304. The monitoring system 302 can further include a system bus 308 that can couple various components including, but not limited to, a metadata generation component 310, a security component 312, a metadata extractor component 314, and a wireless component 316.

Aspects of systems (e.g., the monitoring system 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the monitoring system 302 can comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by controller component 306, can facilitate performance of operations defined by the executable component(s) and/or instruction(s). For example, the memory 304 can store computer and/or machine readable, writable, and/or executable components and/or instructions that, when executed by the controller component 306, can facilitate execution of the various functions described herein relating to the metadata generation component 310, the security component 312, the metadata extractor component 314, and the wireless component 316. In some embodiments, the memory 304 can be used to store a mirror copy of the that metadata product (e.g., a product that contain architecture information about the distributed storage system 104, described in detail below).

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 1016 and FIG. 10. Such examples of memory 304 can be employed to implement any embodiments of the subject disclosure.

According to some embodiments, the controller component 306 can comprise one or more types of processors and/or electronic circuitry that can implement one or more computer and/or machine readable, writable, and/or executable components and/or instructions that can be stored on the memory 304. For example, the controller component 306 can perform various operations that can be specified by such computer and/or machine readable, writable, and/or executable components and/or instructions including, but not limited to, logic, control, input/output (I/O), arithmetic, and/or the like. In some embodiments, controller component 306 can comprise one or more central processing unit, multi-core processor, microprocessor, dual microprocessors, microcontroller, System on a Chip (SOC), array processor, vector processor, and/or another type of processor.

In some embodiments, the components of monitoring system 302, for example, the controller component 306, the memory 304, the metadata generation component 310, the security component 312, the metadata extractor component 314, and/or the wireless component 316 can be communicatively, electrically, and/or operatively coupled to one another via the system bus 308 to perform functions of the monitoring system 302, and/or any components coupled therewith. In several embodiments, the system bus 308 can comprise one or more memory bus, memory controller, peripheral bus, external bus, local bus, and/or another type of bus that can employ various bus architectures. Further examples of the system bus 308 are described below with reference to a system bus 1018 and FIG. 10. Such examples of system bus 308 can be employed to implement any embodiments of the subject disclosure.

In several embodiments, the monitoring system 302 can comprise one or more computer and/or machine readable, writable, and/or executable components and/or instructions that, when executed by the controller component 306, can facilitate performance of operations defined by such component(s) and/or instruction(s). Further, in numerous embodiments, any component associated with the monitoring system 302, as described herein with or without reference to the various figures of the subject disclosure, can comprise one or more computer and/or machine readable, writable, and/or executable components and/or instructions that, when executed by the controller component 306, can facilitate performance of operations defined by such component(s) and/or instruction(s). For example, the metadata extractor component 314, and/or any other components associated with the monitoring system 302 (e.g., communicatively, electronically, and/or operatively coupled with and/or employed by monitoring system 302), can comprise such computer and/or machine readable, writable, and/or executable component(s) and/or instruction(s). Consequently, according to numerous embodiments, the monitoring system 302 and/or any components associated therewith, can employ the controller component 306 to execute such computer and/or machine readable, writable, and/or executable component(s) and/or instruction(s) to facilitate performance of one or more operations described herein with reference to the monitoring system 302 and/or any such components associated therewith.

In some embodiments, the monitoring system 302 can facilitate performance of operations related to and/or executed by the components of monitoring system 302, for example, the controller component 306, the memory 304, the metadata generation component 310, the security component 312, the metadata extractor component 314, and/or the wireless component 316. For example, as described in detail below, the monitoring system 302 can facilitate: generating, by a network storage device comprising a processor (e.g., metadata generation component 310), a metadata product comprising one or more data items associated with a distributed architecture of a file system, wherein the file system comprises one or more data files stored in one or more disks; monitoring, by the network storage device (e.g., security component 312), the file system, wherein the device generates an alert upon detecting a degradation event associated with the one or more data files or one or more disks; and extracting, by the network storage device (e.g., by metadata extractor component 314), one or more data items from the metadata product in response to receiving the alert from the security component.

In another example, as described in detail below, the monitoring system 302 can facilitate: generating, by a network storage device comprising a processor (e.g., metadata generation component 310), a metadata product having one or more data items associated with an architecture of a distributed file system; extracting, by the network storage device (e.g., the metadata extractor component 314), the one or more data items from the metadata product in response to receiving an alert, wherein the alert is generated in response to an occurrence of a degradation event; and generating, by the network storage device (e.g., report generating component 508), a report comprising the one or more data items extracted by the network storage device.

In some embodiments, the metadata generation component 310 can comprise, but not limited to, one or more electronic devices and processor to generate one or more metadata product (e.g., a file that contains architecture of the distributed storage system 104 and characteristic of content contained in data files or disks stored on one or more disks). In some embodiments, the metadata generation component 310 periodically captures one or more the characteristics of the distributed file system. The characteristics may include, but not limited to, a node number, a disk number, the type of filed on the disk, characteristics of content of disk or in the data file (e.g., credit cards, bank accounts, emails), modification date, date and time of recent security update, level of security, IP address, and/or location (e.g., physical address of the facility, floor number, room number, rack number) of the distributed storage system 104. Various data structure and indexing techniques may be employed to generate the metadata product. In some embodiments, the metadata generation component 310 can generate a metadata product comprising one or more data items associated with a distributed architecture of a file system, wherein the file system comprises one or more data files stored using one or more of disks 150', 160' and/or 170'.

In some embodiments, the metadata product may contain the file structure of the distributed storage system (e.g., architecture mapping information). For example, a file map comprising, facility number, floor number, room number, IP address, node number, disk number (e.g., drive number), file structure and/or names and types of files. In some embodiment, the metadata product can comprise information starting at the disk level. For example, a data structure organized by disk number. The advantage of organizing the metadata with disk number is that when a disk is stolen, the types of files at risk can be easily retrieved.

In some embodiments, the metadata generation component generates one or more data items, wherein the one or more data items can comprise location data of data file or disk within the distributed architecture. In some embodiments, the location data comprises drive (e.g., disk) information (e.g., IP address of the disk and/or location data structure) specifying the location of a drive of the file system comprising one or more data files or one or more disks that generated the degradation event. For example, the location data can provide the IP address, and the location data structure can have physical address of the facility that maintains the distributed storage system (e.g., street address, city, state and zip code), location within the facility (e.g., floor and room number where the computers are located). In some embodiments, the location data comprises node information specifying a node of the file system (e.g., IP address or node number) and physical location. For example, data structure having node number (e.g., Node 112A or IP address of the node) and street address where the node is located.

In some embodiments, the metadata generation component 310 generates the metadata product comprising one or more data item, wherein data items comprise content characteristics of the one or more data files or one or more disks. In some embodiments, the metadata generation component 310 generates the metadata product periodically, for example, every 60 minutes. Depending on the security requirements, the frequency of generating the metadata product may be less than 60 minutes. In some embodiments, frequency generating the metadata may be associated with frequency of updates or time of day.

In some embodiments, a copy of the metadata product (e.g., mirror copy) can be stored in memory located at physical location that is different from the distributed storage system 104. In some embodiments, for additional security and fast retrieval, the metadata product can be store on separate second storage distribution system (not shown) that is not connected to the distributed storage system 104.

In some embodiments, the monitoring system 302 can comprise the security component 312 to monitor the activities associated with distributed storage system 104. In some embodiments, the security component 312, can comprise one or more processors, memory, and electrical circuitry. In some embodiments, the security component 312 can monitor the distributed storage system (e.g., file system) and can generate an alert in response to detecting a degradation event associated with (e.g., that impacted) one or more data files or disks stored within the distributed storage system 104. For example, when cluster (e.g., a collection of node/disk) is degraded, security component gets notification of such degraded event and knows which specific node/disk is out from cluster and then it performs a scan to extract what data files were present on degraded node/drive. In some embodiments, the security component 312 can comprise an artificial intelligence logic that employs one or more neural networks for deep learning to predict which disk/file is at higher risk of degradation or high risk of breach. The security component 312 can monitor use of the file, frequency of security updates (e.g., how often a access passwords are changed), and level of security (e.g., the strength of passwords). Further, health checks (e.g., removal is disk without authorization, node removal, group change activity, removal and/or access without authorization, outdated security measures) are periodically conducted by the security component 312 and if health checks result in a failed condition, a degradation event is triggered. For example, if one or more disk is physically removed without authorization (e.g., removed without using proper protocols set up by the administrator of the distributed storage system 104), a degradation event can be triggered, and the administrator can be alerted. In another example, if one or more data files or disks, stored within the distributed storage system 104, is accessed and/or removed without authorization, the degradation event can be triggered. In some embodiments, the security component 312 can comprise an artificial intelligence logic that employs one or more neural networks for deep learning to predict which disk and/or file is at higher risk of degradation or at high risk of breach.

In some embodiments, the monitoring system 302 can comprise the metadata extractor component 314 that extracts one or more data items from the metadata product. In some embodiments, the metadata extractor component 314, can comprise one or more processors, memory, and electrical circuitry to facilitate extraction of information on data files from the metadata product. In some embodiments, the metadata extractor component 314 can decrypt the metadata product (e.g., where file containing information about the distributed filed system is encrypted) in response to receiving a degradation event triggered by degradation of one or more data files. Depending on the methods employed to generate and protect the metadata product (i.e., specific encryption, compressed technique, one or more password layers), corresponding methods are employed to extract data items from the metadata product.

In some embodiments, the monitoring system 302 can comprise a wireless component 316 to transmit alerts to administrator or other components of the monitoring system 302. For example, if a disk is removed without authorization, an alert or notification can be transmitted using the wireless component 316.

In some embodiments, the wireless component 316 can be wireless processor that can interface with one or more sensor devices (not shown) and the controller component 306. According to some embodiments, the wireless component 316 can include one or more wireless networks, including, but not limited to, a cellular network, a wide area network (WAN) (e.g., the Internet access through wireless technology) or a local area network (LAN). For example, wireless component 316 can comprise wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 3 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In some embodiments, the wireless component 316 can comprise a transmitter and a receiver for infrared, near-field communication-NFC, Bluetooth, or any suitable wireless communication protocol.

Figure 4:
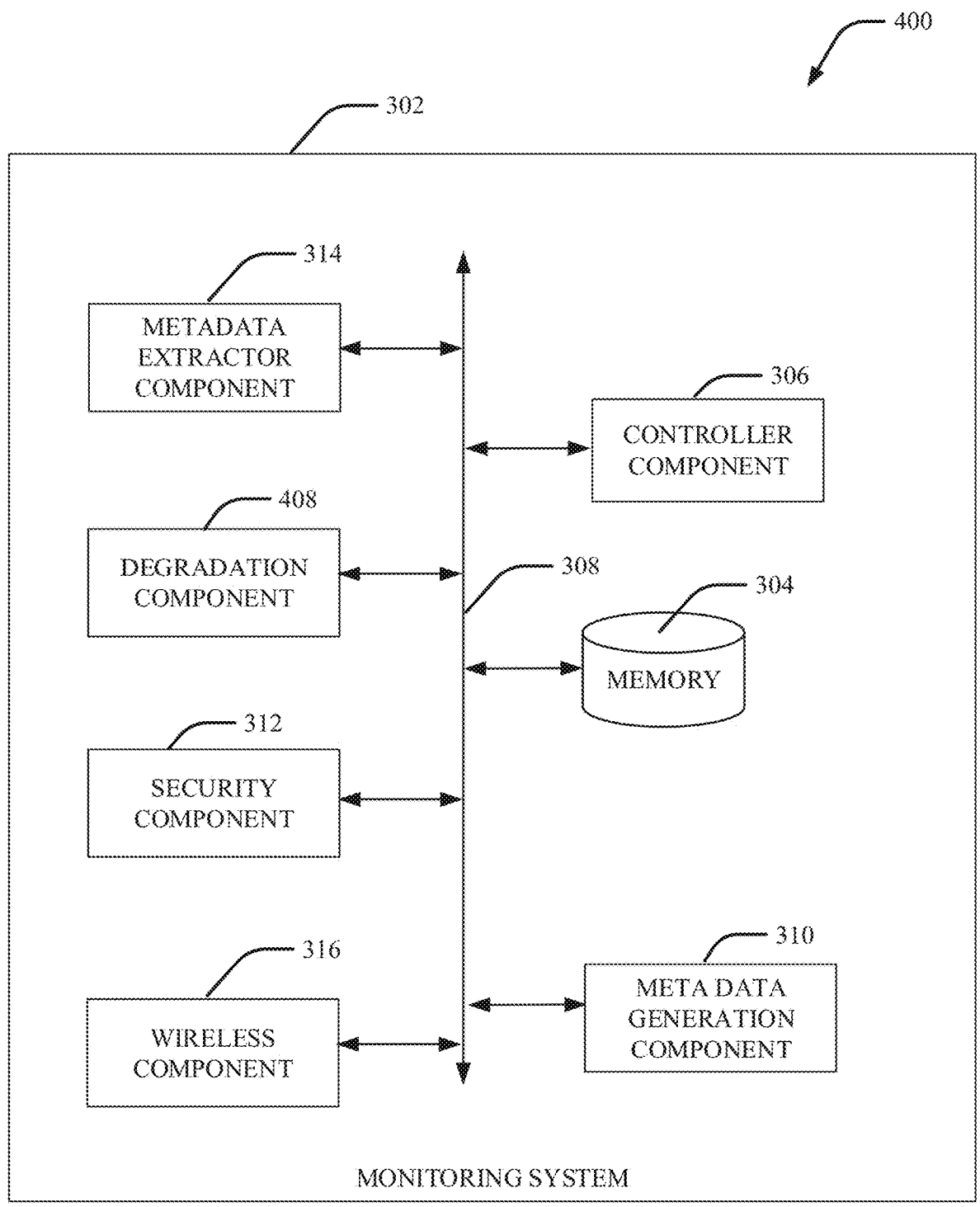
FIG. 4 illustrates a block diagram of an example, non-limiting system that facilitates of the monitoring system components in accordance with one or more embodiments described herein.

FIG. 4 illustrates a block diagram of an example, non-limiting system 400 that facilitates of the monitoring system 302 components in accordance with one or more embodiments described herein. Repetitive description of like elements employed in respective embodiments is omitted for sake of brevity. According to several embodiments, the system 400 can comprise monitoring system 302. In some embodiments, monitoring system 302 can further comprise a degradation component 408.

In several embodiments, the degradation component 408 can comprise one or more sensors, memory, and one or more processors to facilitate generation of a degradation event. In some embodiments, the degradation component 408 can generate the degradation event in response to the one or more data files or disks being determined, by the security component 312, to have been removed from the file system without authorization. In some embodiments, the degradation component 408 can generate the degradation event in response to the one or more data files or disks being determined to have been accessed without authorization. In some embodiments, using an artificial inelegance logic and neural networks, the degradation component 408 can predict if degradation is likely to occur. For example, based on the type of security breach that have occurred, the degradation component 408 can identify other data files or disks that may be impacted and can trigger a degradation event for those data files or disks. The advantage is that the administrator can take appropriate action to secure those files at a higher risk. In some embodiments, the frequency of monitoring can be increased for those files that have higher probability of breach until the administrator has taken addition measure to secure the files.

Figure 5:
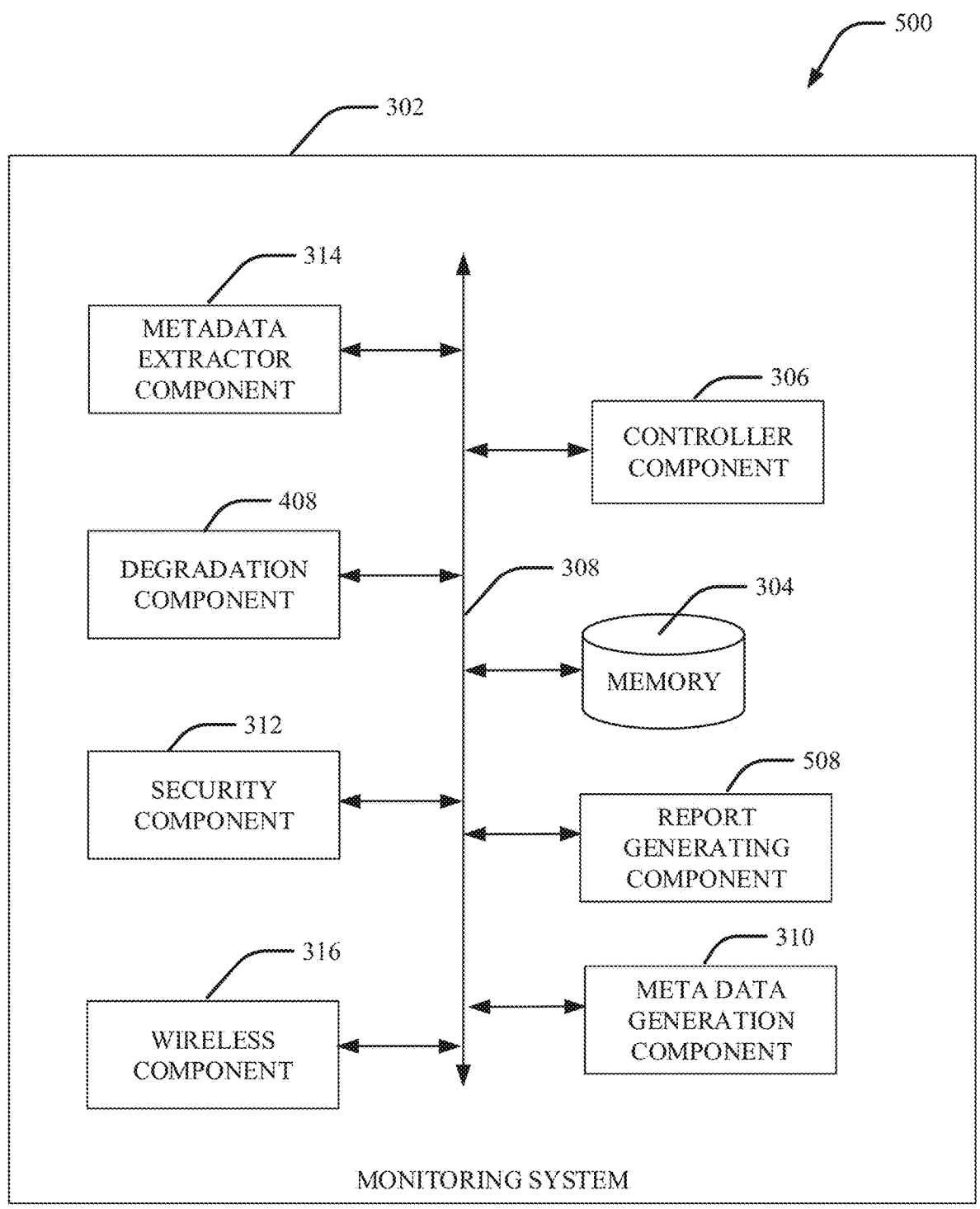
FIG. 5 illustrates a block diagram of an example, non-limiting system that facilitates of the monitoring system components in accordance with one or more embodiments described herein.

FIG. 5 illustrates a block diagram of an example, non-limiting system 500 that facilitates of the monitoring system 302 components in accordance with one or more embodiments described herein. Repetitive description of like elements employed in respective embodiments is omitted for sake of brevity. According to several embodiments, the system 500 can comprise monitoring system 302. In some embodiments, monitoring system 302 can further comprise a report generating component 508.

In several embodiments, the report generating component 508 can comprise a display and/or one or more electronic devices to display a report. In some embodiments, the report generating component 508 can generates a report that comprises one or more data items extracted by the metadata extractor. For example, the report can display one or more disks and/or data files that were breached. The report can also contain location information of the distributed storage system 104 and specific location of the disk that caused the degradation event to trigger. In some embodiments, the report can comprise node information (e.g., location of node and/or node number) of the data file or disk within the distributed storage system 104 that caused the degradation event to be triggered.

In some embodiments, the report generating component 508 can request the metadata extractor component 314 to extract information associated with the data file or the disk that caused the degradation event (e.g., information about the stolen disk). The extracted information can include, but not limited to, types of content stored on the disk, security measures for each data file or disk, possible actions available to execute remotely (e.g., erase files remotely), content organized by owner or based on preferences of the administrator. In some embodiments, the report generator can transmit the report to one or more predefined digital address using the wireless component 316. The advantage of generating a report that comprises the type of content and content is that owners of the sensitive content can be identified from the report. Having the report will allow administrators of the distributed storage system 104 to take immediate action to prevent further physical theft, take action to prevent access to stolen disks, and notify the owners so that owners can take appropriate actions to prevent further breach.

In some embodiments, the report generating component 508 comprises a notification system, wherein a notification related to one or more data files or disks that were either removed or breached (e.g., degradation event) is generated and transmitted using the wireless component 316. The notification can comprise a disk identification of a disk associated with the degradation event and a node identification of a node that contains the disk associated with the degradation event. For example, in response to occurrence of degradation event, the notification system can notify the administrator and provide information about one or more data files or disks, one or more disks and one or more nodes affected by the degradation event. The advantage of providing notification is the administrator take immediate action. In some embodiments, the notification may be provided owner of the content that was either stolen or breached.

Figure 6:
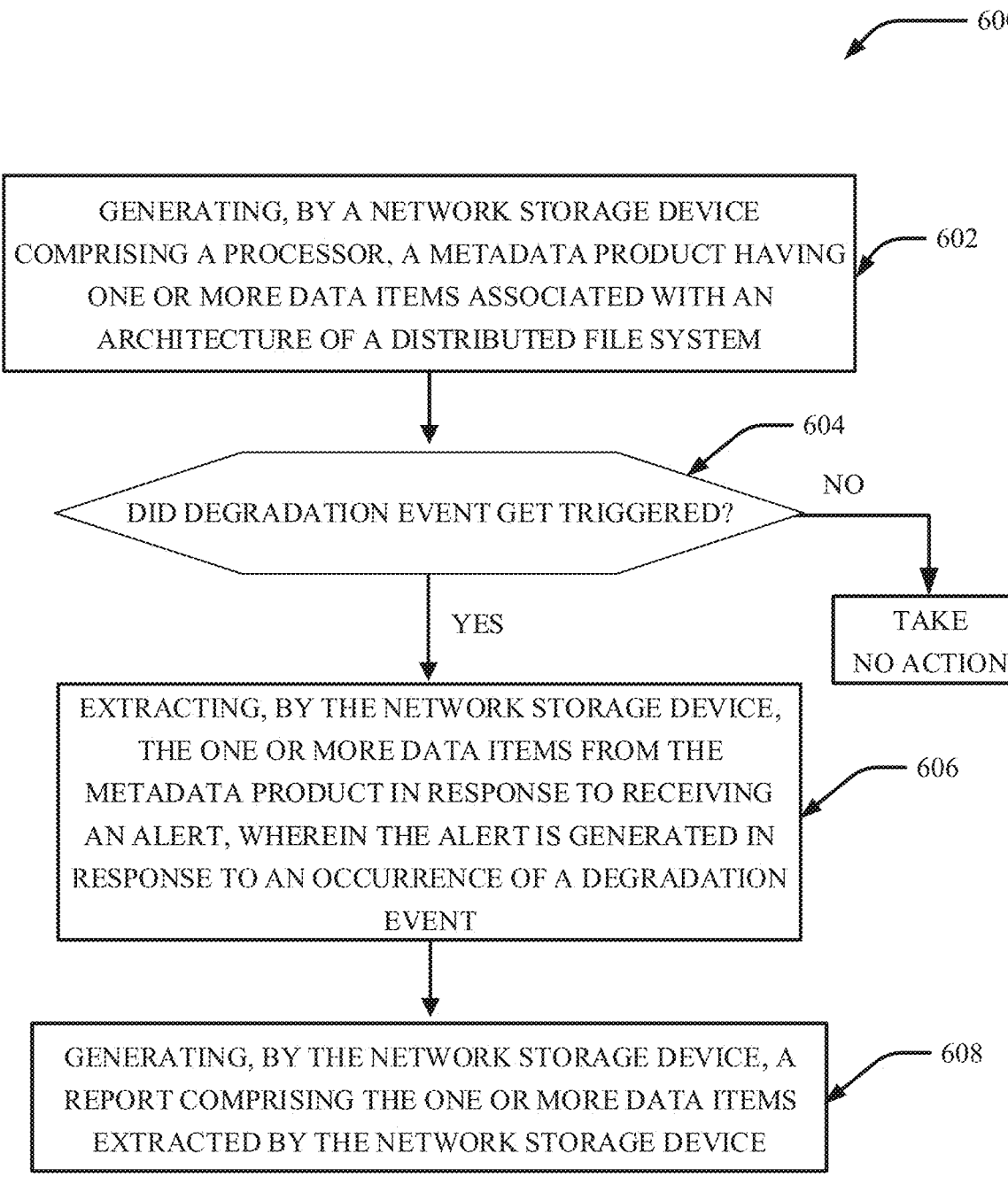
FIG. 6 depicts a diagram of an example, non-limiting computer implemented method that facilitates using the monitoring system accordance with one or more embodiments describe herein.

FIG. 6 depicts a diagram of an example, non-limiting computer implemented method that facilitates using the monitoring system 302 accordance with one or more embodiments describe herein. Repetitive description of like elements employed in other embodiments described herein is omitted for sake of brevity. In some examples, flow diagram 600 can be implemented by operating environment 1000 described below. It can be appreciated that the operations of flow diagram 600 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts generating, by a network storage device comprising a processor, a metadata product having one or more data items associated with an architecture of a distributed file system. Operation 604 depicts determining if the degradation event was triggered. If degradation event was triggered, then perform operation 606. Otherwise, continue monitoring. Operation 606 depicts extracting, by the network storage device, the one or more data items from the metadata product in response to receiving an alert, wherein the alert is generated in response to an occurrence of a degradation event. Operation 608 depicts generating, by the network storage device, a report comprising the one or more data items extracted by the network storage device.

Figure 7:
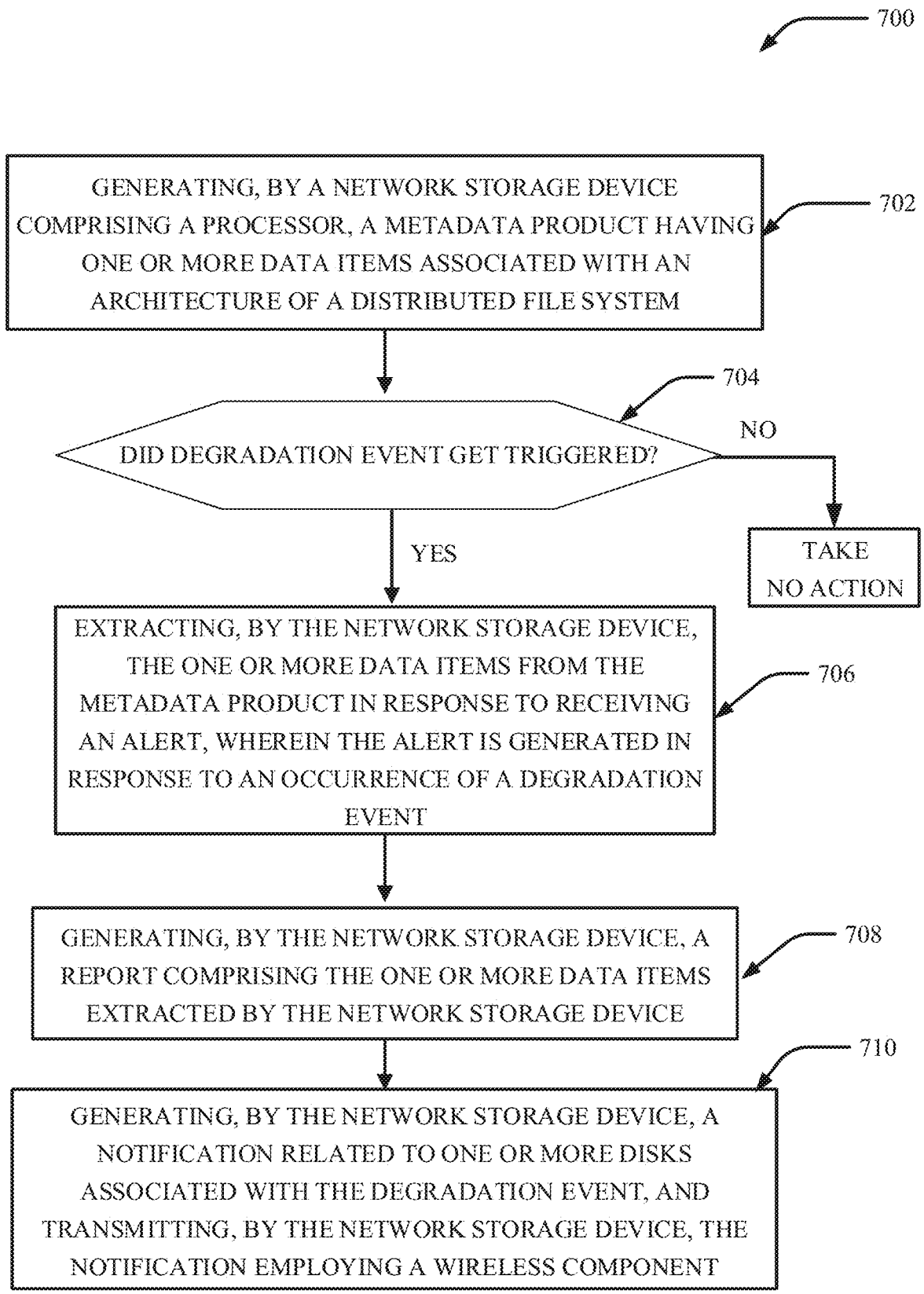
FIG. 7 depicts a diagram of an example, non-limiting computer implemented method that facilitates using the monitoring system accordance with one or more embodiments describe herein.

FIG. 7 depicts a diagram of an example, non-limiting computer implemented method that facilitates using the monitoring system 302 accordance with one or more embodiments describe herein. Repetitive description of like elements employed in other embodiments described herein is omitted for sake of brevity. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts generating, by a network storage device comprising a processor, a metadata product having one or more data items associated with an architecture of a distributed file system. Operation 704 depicts determining if the degradation event was triggered. If degradation event was triggered, then perform operation 706. Otherwise, continue monitoring. Operation 706 depicts extracting, by the network storage device, the one or more data items from the metadata product in response to receiving an alert, wherein the alert is generated in response to an occurrence of a degradation event. Operation 708 depicts generating, by the network storage device, a report comprising the one or more data items extracted by the network storage device. Operation 710 depicts generating, by the network storage device, a notification related to one or more data files or one or more disks associated with the degradation event and transmitting, by the network storage device, the notification employing a wireless component.

Figure 8:
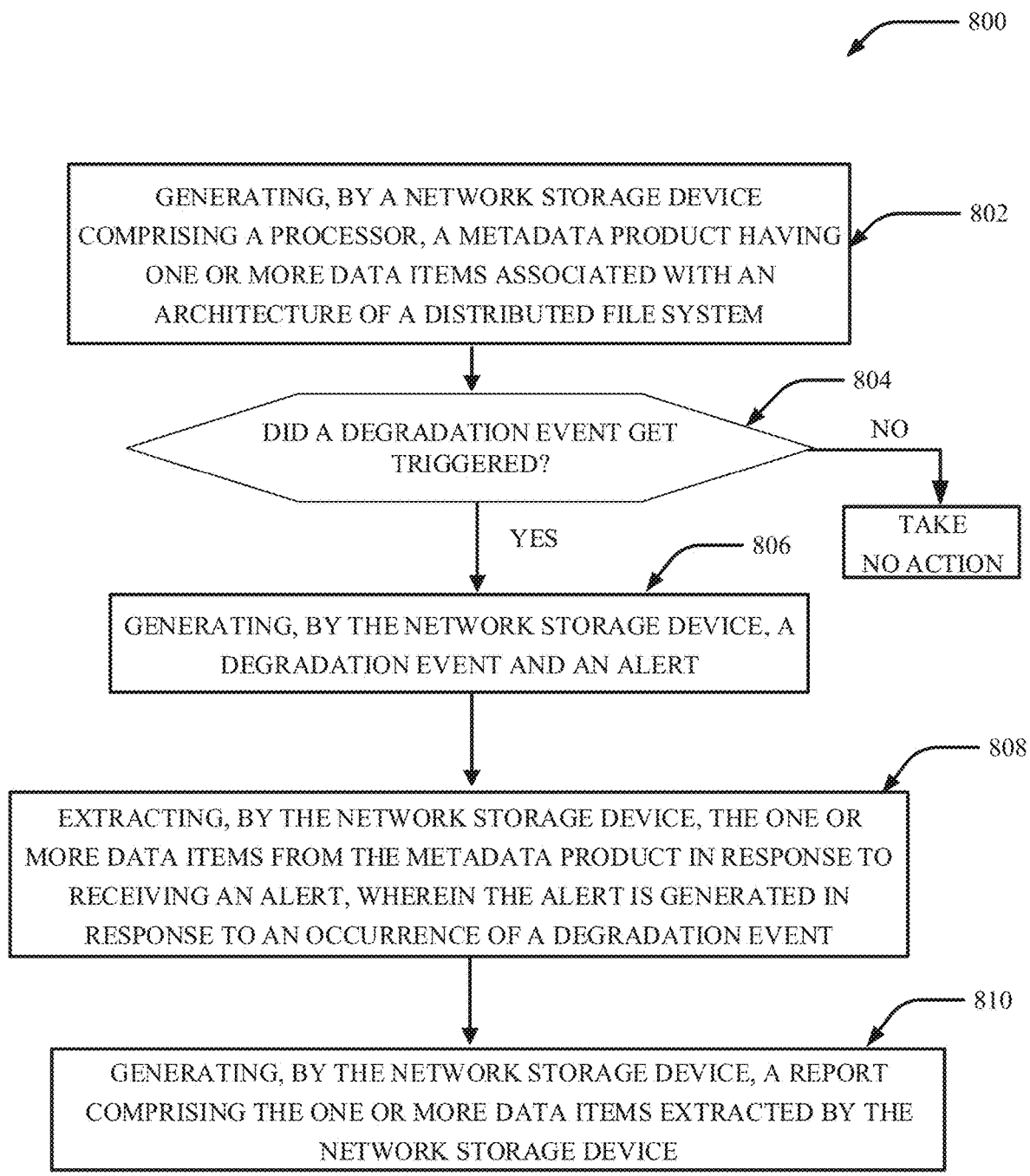
FIG. 8 depicts a diagram of an example, non-limiting computer implemented method that facilitates using the monitoring system accordance with one or more embodiments describe herein.

FIG. 8 depicts a diagram of an example, non-limiting computer implemented method that facilitates using the monitoring system 302 accordance with one or more embodiments describe herein. Repetitive description of like elements employed in other embodiments described herein is omitted for sake of brevity. In some examples, flow diagram 800 can be implemented by operating environment 1000 described below. It can be appreciated that the operations of flow diagram 800 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts generating, by a network storage device comprising a processor, a metadata product having one or more data items associated with an architecture of a distributed file system. Operation 804 depicts determining if degradation event was triggered (e.g., a data file or disk was removed without authorization). If degradation event was triggered, then perform operation 806. Otherwise, continue monitoring. Operation 806 depicts generating, by the network storage device, a degradation event and an alert. Operation 808 depicts extracting, by the network storage device, the one or more data items from the metadata product in response to receiving an alert, wherein the alert is generated in response to an occurrence of a degradation event. Operation 810 depicts generating, by the network storage device, a report comprising the one or more data items extracted by the network storage device.

Figure 9:
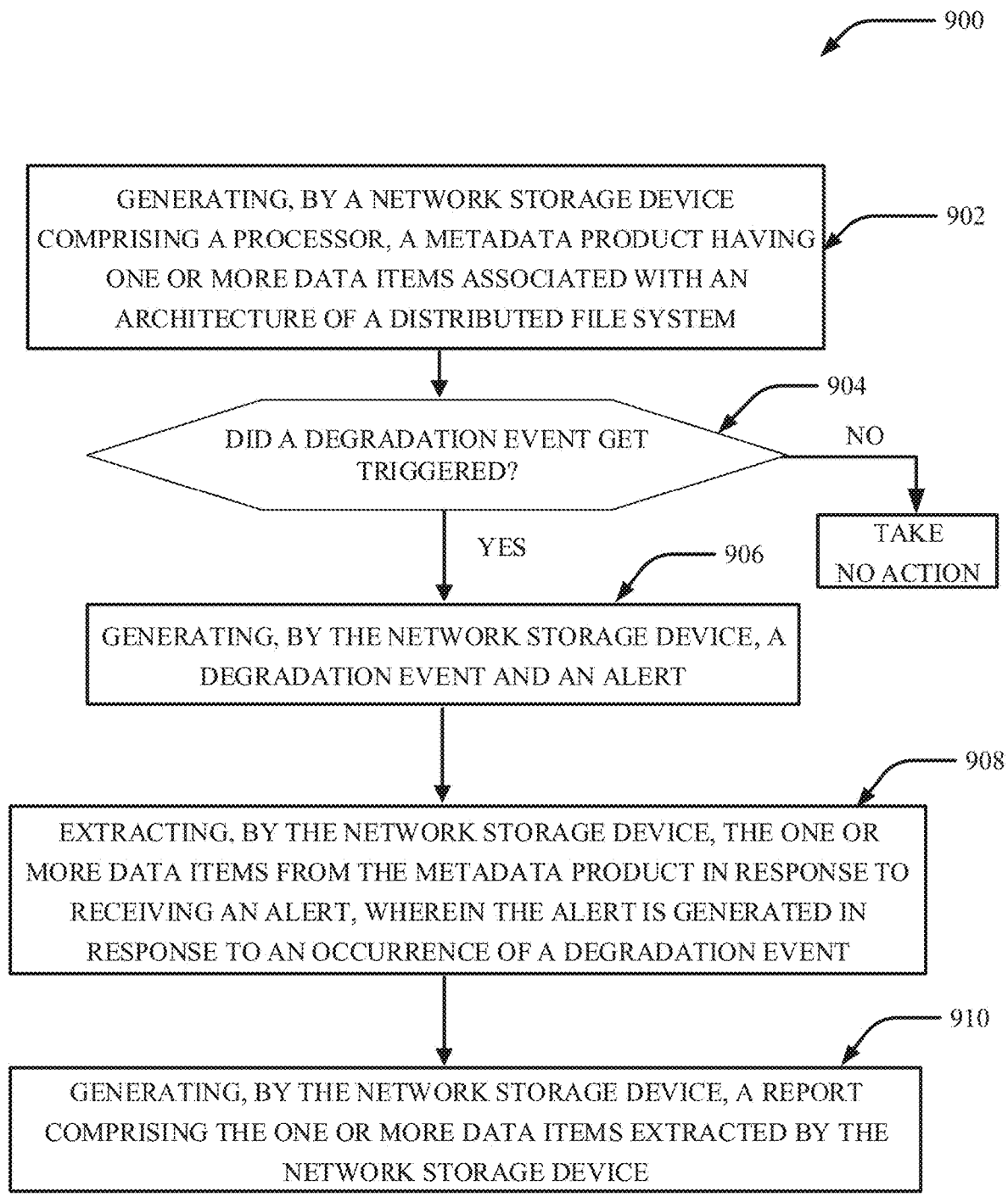
FIG. 9 depicts a diagram of an example, non-limiting computer implemented method that facilitates using the monitoring system accordance with one or more embodiments describe herein.

FIG. 9 depicts a diagram of an example, non-limiting computer implemented method that facilitates using the monitoring system 302 accordance with one or more embodiments describe herein. Repetitive description of like elements employed in other embodiments described herein is omitted for sake of brevity. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts generating, by a network storage device comprising a processor, a metadata product having one or more data items associated with an architecture of a distributed file system. Operation 904 depicts determining if degradation event was triggered (e.g., a data file or disk was removed without authorization). If degradation event was triggered, then perform operation 906. Otherwise, continue monitoring. Operation 906 depicts generating, by the network storage device, a degradation event and an alert. Operation 908 depicts extracting, by the network storage device, the one or more data items from the metadata product in response to receiving an alert, wherein the alert is generated in response to an occurrence of a degradation event. Operation 910 depicts generating, by the network storage device, a report comprising the one or more data items extracted by the network storage device.

Figure 10:
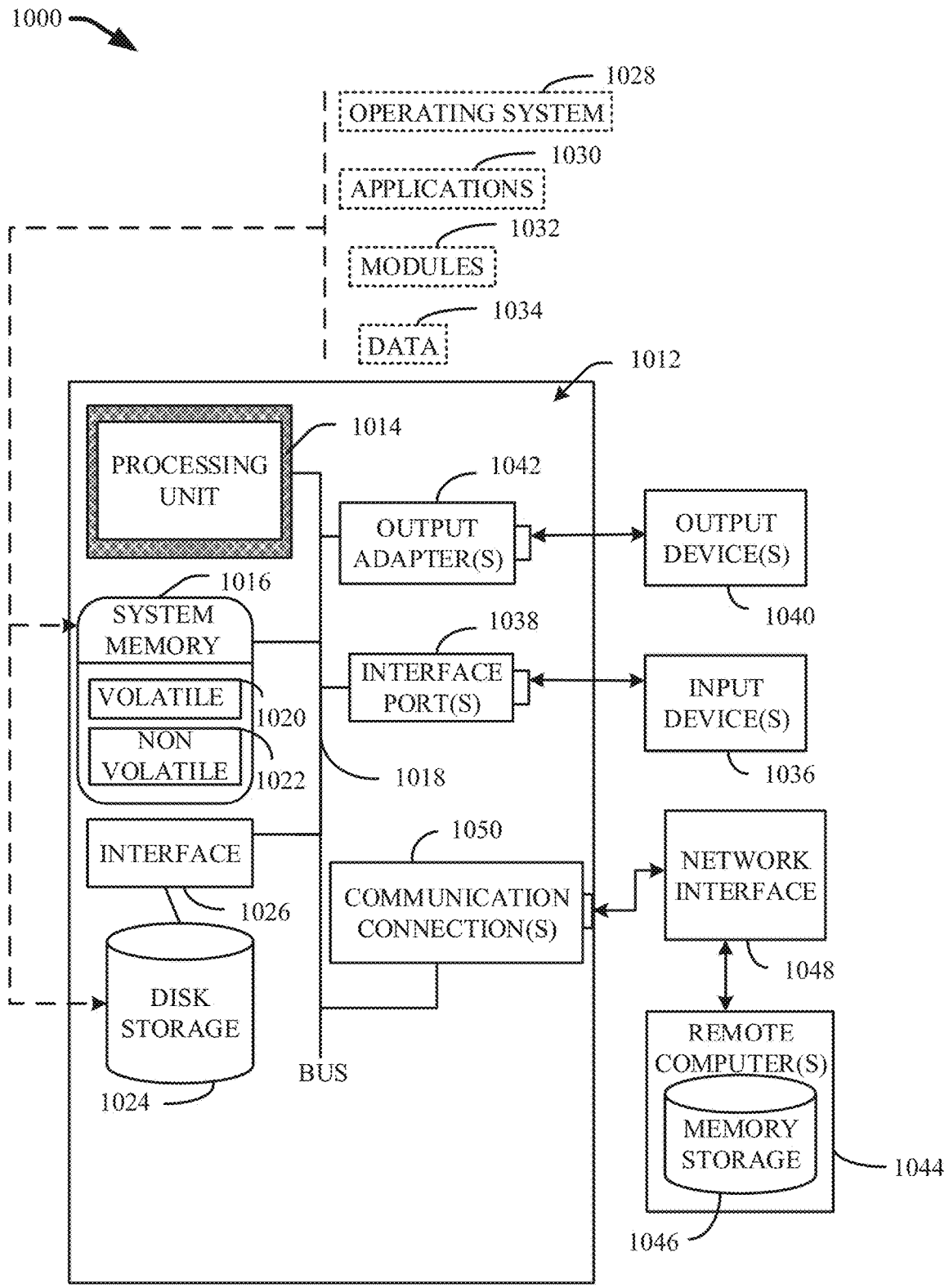
FIG. 10 illustrates a block diagram of an example, non-limiting operating environment in which one or more embodiments described herein can be facilitated.

FIG. 10 illustrates a block diagram of an example, non-limiting operating environment 1000 in which one or more embodiments described herein can be facilitated. The operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all the elements described relative to computer 1012. For purposes of brevity, only a memory storage device 1046 is illustrated with remote computer(s) 1044. Remote computer(s) 1044 is logically coupled to computer 1012 through a network interface 1048 and then physically coupled via a communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be coupled to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a metadata generation component that generates a metadata product comprising data items associated with a distributed architecture of a file system, wherein the file system comprises disks;
        a security component that monitors the file system, wherein the security component generates an alert in response to detecting a degradation event associated with at least one disk of the disks; and
        a metadata extractor component that extracts at least one data item associated with the at least one disk from the data items of the metadata product in response to receiving the alert from the security component; and
        a degradation component that predicts at least one other disk of the disks, other than the at least one disk, that has an increased risk of another degradation event in response to the degradation event.

2. The system of claim 1, wherein the computer executable components further comprise:
    a reporting component that generates a report comprising the at least one data item extracted by the metadata extractor component.

3. The system of claim 1, wherein the degradation component further generates the degradation event in response to the at least one disk being determined to have been removed from the file system without authorization.

4. The system of claim 1, wherein the degradation component further generates the degradation event in response to the at least one disk being determined to have been accessed without authorization.

5. The system of claim 1, wherein the at least one data item comprises location data associated with respective locations within the distributed architecture of the file system of the at least one disk associated with the degradation event.

6. The system of claim 5, wherein the respective locations comprise physical addresses of the disks.

7. The system of claim 5, wherein the location data comprises node information specifying a node of the file system comprising the at least one disk associated with the degradation event.

8. The system of claim 1, wherein the at least one data item comprises respective content of the at least one disk that generated the degradation event.

9. The system of claim 1, wherein the at least one data item comprises a time when the degradation event was detected.

10. A method, comprising:
generating, by a network storage device comprising a processor, a metadata product comprising data items associated with an architecture of a distributed file system, wherein the distributed file system comprises disks;
in response to receiving an alert associated with a first degradation event associated with at least one disk of the disks, extracting, by the network storage device, at least one data item associated with the at least one disk from the data items of the metadata product;
generating, by the network storage device, a report comprising the at least one data item extracted by the network storage device; and
predicting, by the network storage device, at least one other disk of the disks that has an increased risk of a second degradation event as a result of the first degradation event.

11. The method of claim 10, further comprising:
generating, by the network storage device, a notification related to the at least one disk associated with the first degradation event; and
transmitting, by the network storage device, the notification employing a wireless component.

12. The method of claim 11, wherein the notification comprises respective disk identifications of the at least one disk associated with the first degradation event and a node identification of a node that contains the at least one disk associated with the first degradation event.

13. The method of claim 10, further comprising:
generating, by the network storage device, the first degradation event in response to the at least one disk being determined to have been removed from the distributed file system without authorization; and
generating, by the network storage device, the alert in response to detecting the first degradation event.

14. The method of claim 10, further comprising:
generating, by the network storage device, the first degradation event in response to the at least one disk being determined to have been accessed without authorization; and
generating, by the network storage device, the alert in response to detecting the first degradation event.

15. The method of claim 10, wherein the at least one data item comprise respective location information of the at least one disk impacted by the first degradation event, characteristics of respective content stored within the at least one disk and a time when the first degradation event occurred.

16. The method of claim 10, further comprising:
extracting, by the network storage device, at least one other data item associated with the at least one other disk from the data items of the metadata product; and
including, by the network storage device, the at least one other data item in the report.

17. A computer program product that provides information about a disk that associated with a degradation event, the computer program product comprising a non-transitory computer readable medium having program instructions embodied therewith, the program instructions executable by a processor to cause the processor to:
generate a metadata product having data items associated with an architecture of a distributed file system, wherein the distributed file system comprises disks;
generate an alert in response to detecting a first degradation event associated with a first disk of the disks;
predict a second disk of the disks that has an increased risk of a second degradation event in response to the first degradation event; and
extract respective data items associated with the first disk and the second disk from the data items of the metadata product.

18. The computer program product of claim 17, wherein the program instructions are further executable by the processor to cause the processor to:
generate a report comprising the respective data items extracted by the metadata extractor component.

19. The computer program product of claim 17, wherein the program instructions are further executable by the processor to cause the processor to:
transmit, by a wireless component, one or more characteristics of the first disk in response to the first disk being determined to have been removed from the distributed file system without authorization.

20. The computer program product of claim 17, wherein the program instructions are further executable by the processor to cause the processor to:
transmit, by a wireless component, one or more characteristics of the first disk in response to the first disk being determined to have been accessed without authorization.

* * * * *